(12) United States Patent
Halevi

(10) Patent No.: US 10,635,121 B2
(45) Date of Patent: Apr. 28, 2020

(54) SYSTEM, DEVICE AND METHOD FOR MODIFYING TEMPERATURE AND HUMIDITY

(71) Applicant: Hanoch Halevi, Rehovot (IL)

(72) Inventor: Hanoch Halevi, Rehovot (IL)

(*) Notice: Subject to any disclaimer, the term of this patent is extended or adjusted under 35 U.S.C. 154(b) by 42 days.

(21) Appl. No.: 15/647,502

(22) Filed: Jul. 12, 2017

(65) Prior Publication Data
US 2018/0017980 A1    Jan. 18, 2018

(30) Foreign Application Priority Data

Jul. 12, 2016 (IL) .......................................... 246742

(51) Int. Cl.
| | | |
|---|---|---|
| *F24F 6/00* | (2006.01) | |
| *G05D 23/19* | (2006.01) | |
| *F17C 9/04* | (2006.01) | |
| *G05D 22/02* | (2006.01) | |
| *G05D 23/24* | (2006.01) | |
| *F24F 110/20* | (2018.01) | |
| *F24F 11/30* | (2018.01) | |
| *F24F 110/10* | (2018.01) | |
| *F24F 11/79* | (2018.01) | |
| *F24F 11/00* | (2018.01) | |

(52) U.S. Cl.
CPC .......... *G05D 23/1931* (2013.01); *F17C 9/04* (2013.01); *G05D 22/02* (2013.01); *G05D 23/2401* (2013.01); *F24F 11/0008* (2013.01); *F24F 11/30* (2018.01); *F24F 11/79* (2018.01); *F24F 2110/10* (2018.01); *F24F 2110/20* (2018.01)

(58) Field of Classification Search
None
See application file for complete search history.

(56) References Cited

U.S. PATENT DOCUMENTS

| | | | |
|---|---|---|---|
| 2,591,213 A | 4/1952 | Loyd Adams et al. | |
| 5,611,967 A * | 3/1997 | Jane .................... | B01F 3/04085 261/107 |
| 5,850,968 A | 12/1998 | Jokinen | |
| 5,938,984 A * | 8/1999 | Jung .................... | F24F 11/0008 219/510 |
| 6,244,576 B1 * | 6/2001 | Tsai ......................... | F24F 6/02 261/141 |
| 6,369,362 B1 | 4/2002 | Brenn | |
| 8,844,432 B2 | 9/2014 | Willett | |
| 2002/0089075 A1 | 7/2002 | Light et al. | |
| 2013/0274930 A1 | 10/2013 | George | |

FOREIGN PATENT DOCUMENTS

CN           103548910 B     12/2015

\* cited by examiner

*Primary Examiner* — Paul B Yanchus, III
(74) *Attorney, Agent, or Firm* — Browdy and Neimark, P.L.L.C.

(57) ABSTRACT

The present invention provides devices, machines, systems and methods for generating a desired humidity and temperature condition within a room.

15 Claims, 5 Drawing Sheets

SYSTEM, DEVICE AND METHOD FOR MODIFYING TEMPERATURE AND HUMIDITY

FIELD OF THE INVENTION

The present invention generally relates to devices, machines, systems and methods for generating a desired atmosphere in a room, and more particularly for generating desired humidity and temperature condition within a room.

BACKGROUND OF THE INVENTION

Some devices, especially thermal equipment, as well as most food stuff, often require a precise and stable thermal and humidity environment. However, due to normal use, e.g., opening and closing a room door for entering and exiting, or for insertion and extraction of material such as food stuff from the room or a container, the internal environment of such a room/container is constantly disrupted. Accordingly, a need exists for a system having the ability to maintain an essentially constant temperature while keeping a humid environment.

The maintenance of an essentially constant temperature and humidity is critical when handling food stuff: applying too much dry heat might harden the food, and too much moist heat might condense on the food and make it soggy. Common heat units used in the food industry have horizontal racks, and often present the problem of overheating and drying food placed on the upper racks, while food on the lower racks experiences condensation and insufficient heating.

Another application of such humidity and temperature generating systems is in the bakery industry, which requires thawing frozen dough and subsequently rising the dough. Usually, the dough is delivered to bakeries in a frozen state, already in the shape of the final product. In the bakery, the dough is then thawed, let to rise, and baked. Although this procedure has many advantages, in order to obtain consistent quality products, it is essential that the thawing process is accurately controlled. Specifically, accumulation of moisture in the frozen dough pieces, and/or inadequate thawing may lead to inferior quality products. This problem is aggravated when the thawing environment constantly varies. Another problem arises when thawing in the same room different products having various shapes and sizes, which inherently require different thawing conditions.

U.S. Pat. No. 8,844,432 describes dough conditioning devices for thawing frozen dough pieces, said devices comprise a closed case with inner trays for placing the dough thereon, humidity and heat supply system(s), and a dough conditioning gas supply system. U.S. Pat. No. 6,369,362 describes a single and double sided ventless humidity cabinet. CN 103548910 describes a constant temperature and humidity fermenting box.

Accordingly, a need exists for a device and system that can generate essentially constant temperature and humidity within a room for thawing dough and/or proving the necessary conditions for its rising, in a reduced thawing and rising time.

Another food industry utilizing humidity and temperature generating systems is the dates industry, which often requires the hydrating of dates to meet commercial standards: dates with a water content of about 27-28% are considered as first grade fruit, and do not need additional artificial hydration. However, when the water content of the dates is considerably lower, an artificial process of hydration has to be carried out, or else such dates might not be marketable. Conventional practice in hydrating dates requires a long exposure to humidified atmosphere. In such conventional practice the dates are graded according to dryness and placed on trays in single layers. The trays are then placed on a rack in a steam room, where light steam is bubbled therein via water on the floor. Since such rooms are often not air-tight, there is a constant loss of heat and steam. In addition, it is necessary to shift the trays continuously, so that dates located in the upper trays and lower trays will become equally hydrated.

Experience has shown that the artificial hydrating period ranges from 8 to 36 hours, but usually no less than 24 hours in order to obtain adequate results (first graded dates). It has also been shown that the hydration duration can be reduced by raising the temperature. However, increased temperature might have undesirable effects, such as "caramelizing" the dates, and rupturing and curling of the skin.

U.S. Pat. No. 2,591,213 describes a process and device for hydrating dates, which involves the step of removing most of the atmospheric air from the room and inserting water vapor at a defined temperature range.

US 2013/274930 describes a control system for governing temperature and humidity levels within a confined space by controlling existing cooling-, heating-, and duct-systems, using a plurality of temperature and humidity sensors.

US 2002/089075 describes a steamed humidifier for use together with air heating systems, said humidifier includes a steam nozzle connected to a water feed line coiled around a heating element.

Accordingly, a need exists for a device and system that can generate essentially constant temperature and humidity within a room for hydrating dates in a reduced hydrating time while providing uniformly high quality dates.

The present invention provides such systems and devices suitable for generating essentially constant temperature and humidity within a room and can be utilized for a variety of applications, including hydrating dates and thawing and rising dough.

SUMMARY OF THE INVENTION

The present invention provides a constant temperature and humidity generating system 100 comprising: (a) a cabinet housing 101 having an air entry window 103; (b) at least one cold vaporizing moisture source 104; (c) at least one hot vaporizing moisture source 105; (d) an air blower 109 associated with said air entry window 103; (e) at least one sensor for measuring humidity and/or temperature within said cabinet housing, the room surroundings, and/or the water within said at least one vaporizing moisture sources 104, 105; and (f) a control unit for controlling said vaporizing moisture sources 104, 105 and said air blower 109, wherein said environmental system 100 is designed to generate a desired climate within a room by blowing cold and hot vapors into the room according to need, thereby generating an environment having a predefined humidity and temperature.

The present invention further provides a constant temperature and humidity generating device comprising: (a) a cabinet housing 101 having an air entry window 103; (b) at least one cold vaporizing moisture source 104; (c) at least one hot vaporizing moisture source 105; (d) an air blower 109 associated with said air entry window; (e) at least one sensor for measuring humidity and/or temperature within said cabinet housing, the room surroundings, and/or the water within said at least one vaporizing moisture sources;

and (f) a control unit for controlling said vaporizing moisture sources 104, 105 and said air blower 109, wherein said environmental device is designed to generate a desired climate within a room by blowing cold and hot vapors into said room according to need, thereby generating an environment having a predefined humidity and temperature.

In certain embodiments, said vaporizing moisture sources comprises: (a) a water tank 106, optionally divided into two independent tanks 104, 105 (one for hot vapor and the other for cold vapor); (b) moisture generator (either heat bodies for the hot vapors, or ultrasonic generators for cold vapors); (c) a cover 107 with at least one opening 108 for air to enter and at least one opening 102 for the vapors to exit; (d) at least one (electrical) buoy to measure the water level within said water tank 106; (e) optionally, an additional buoy for protecting the system 100 from depletion of water from said vaporizing moisture sources 104, 105; (f) at least one thermostat for measuring the temperature within said water tank 106; and at least one water faucet.

The present invention further provides a method for generating constant temperature and humidity within a room, said method comprises the steps of: (i) providing the system 100 or the device of the invention, and connecting thereof to a water supply; (ii) placing said system 100 or said device within said room or connecting said vapor openings 102 to said room; (iii) determining the desired temperature and humidity; and (iv) activating said system 100 or said device.

DETAILED DESCRIPTION OF SOME EMBODIMENTS OF THE INVENTION

Figure 1:
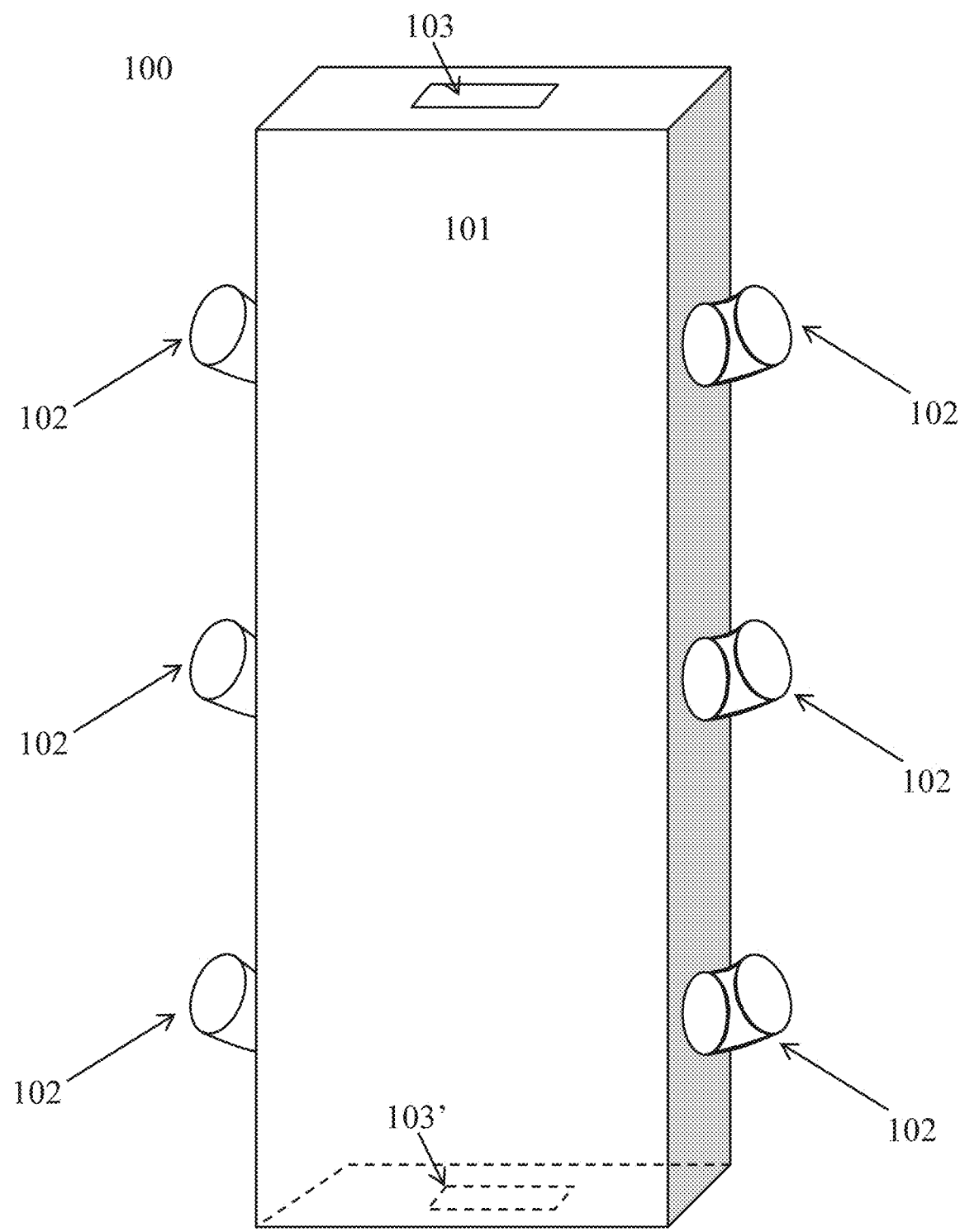
FIG. 1 illustrates the assembled cabinet housing of the system according to some embodiments of the invention.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention provides systems, devices, and methods for adjusting the humidity and temperature of a room according to need. Accordingly, the present invention provides a temperature and humidity generating system 100, wherein said system may be a continuous system that constantly generates humidity and heat to bring the atmosphere within said room to a desired atmosphere.

In certain embodiments, said temperature and humidity generating system 100 of the invention comprises: (a) a cabinet housing 101 having an air entry window 103; (b) at least one cold vaporizing moisture source 104; (c) at least one hot vaporizing moisture source 105; (d) an air blower 109 associated with said air entry window 103 for blowing air into said cabinet housing 101 such that the air moves generally parallel to said at least one vaporizing moisture sources 104, 105; (e) at least one sensor for measuring humidity and/or temperature within: said cabinet housing, the room surroundings, and/or the water within said at least one vaporizing moisture sources 104, 105, wherein said at least one sensor may be located either within or on said cabinet housing 101 or anywhere in said room; and (f) a control unit for controlling said vaporizing moisture sources 104, 105 and said air blower 109 in response to data obtained from said at least one sensor and/or according to definitions of the user, wherein said environmental system 100 is designed to generate a desired climate within a room by blowing cold and hot vapors into the room according to need, thereby generating an environment having a predefined humidity and temperature.

The present invention further provides a temperature and humidity generating device comprising: (a) a cabinet housing 101 having an air entry window 103; (b) at least one cold vaporizing moisture source 104; (c) at least one hot vaporizing moisture source 105; (d) an air blower 109 associated with said air entry window 103; (e) at least one sensor for measuring humidity and/or temperature within said cabinet housing 101, the room surroundings, and/or the water within said at least one vaporizing moisture sources; and (f) a control unit for controlling said vaporizing moisture sources 104, 105 and said air blower 109, wherein said environmental device is designed to generate a desired climate within a room by blowing cold and hot vapors into said room according to need, thereby generating an environment having a predefined humidity and temperature.

In certain embodiments, said at least one cold vaporizing moisture source 104 means 1, 2, 3, 4, 5, 6, 7, 8, 9, 10 or more cold vaporizing moisture source 104. In other embodiments, said at least one hot vaporizing moisture source 105 means 1, 2, 3, 4, 5, 6, 7, 8, 9, 10 or more cold vaporizing moisture source 105.

In certain embodiments, said at least one sensor is designed to measure at least one of: air temperature, humidity, light, air speed, water level, water flow, water temperature, etc. Said sensors may be located either within said cabinet housing 101 or anywhere in the room, depending on the location of the cabinet housing 101 and the measured parameter. For instance, if the cabinet housing 101 is positioned outside the room and the vapor exit pipes 102 are connected via pipes to the room, sensors for measuring the temperature and humidity within the room will be positioned within the room, e.g. in the opposite corner to the vapor entrance, or in all four corners of the room. Alternatively, when the cabinet housing 101 is positioned inside the room, the sensors may be an integral part thereof.

In certain embodiments, the system 100 or device of the invention further comprises a computer comprising a processor and a memory, coupled to said control unit and said at least one sensor. Said computer is designed to enable the user to determine the desired temperature and humidity within a room by controlling the air speed and amount of cold and hot vapors generated by the system 100. Said computer may also monitor and control the amount and temperature of the water within each vaporizing moisture source 104, 105.

In certain embodiments, the air blower 109 is designed to blow air into said cabinet housing 101 and across said vaporizing moisture sources 104, 105. Said blown air can enter each of said vaporizing moisture sources 104, 105 via a designated opening 108 located at the cover 107 of said vaporizing moisture sources 104, 105 to thereby push vapors generated therein outwardly through designated exit openings 102 and into said room.

In a specific embodiment, the system 100 or device of the invention further comprises an opening opposing 103' said entry window 103, e.g. at its lower area when said entry window is located at its top, for providing an exit for the air blown into the cabinet housing 101 and not entering into said vaporizing moisture sources 104, 105. In specific embodiments, said opposing opening 103' may be located at the bottom of said cabinet housing 101 (FIG. 1) and/or at the lower section of the walls of said cabinet housing 101.

In other embodiments, the system 100 or device of the invention further comprises at least one air heater for heating at least one of: (i) the air blown into said at least one hot vaporizing moisture source 105; (ii) the hot vapors generated within said at least one hot vaporizing moisture source 105 prior to their discharge into the room; and/or (iii) the air exiting said cabinet housing 101 via said opposing opening 103'.

In a specific embodiment, said opposing opening 103' is located at the bottom of said cabinet housing 101, and the system 100 or device of the invention further comprises an air heater located in proximity to said opposing opening 103' for heating the air exiting therethrough. In this configuration, the hot air exiting said system 100 tend to rise and thereby circulate the air within said room, thus assist in homogenizing the temperature and humidity within the room.

In certain embodiments, the system 100 or device of the invention further comprises a sterilization unit, which is designed to sterilize: the air blown into said cabinet housing 101, the generated vapors, the water within said vaporizing sources 104, 105, or any combination thereof. The sterilization may be carried out by any known technique such as chemical sterilization, radiation sterilization, filtration, etc. Said sterilization unit may be comprised of a series of ultraviolet lights, special water filters, and/or any other suitable sterilization means.

In specific embodiments, said at least one cold vaporizing moisture source 104 uses ultrasonic generator 104' or nozzles for generating cold vapors. In another specific embodiment, said at least one hot vaporizing moisture source 105 uses heat- or steam-generator (e.g. heaters 105') for generating hot vapors.

In a more specific embodiment, said at least one cold vaporizing moisture source 104 and said at least one hot vaporizing moisture source 105 constitute separate compartments of a single moisture generator (FIG. 5), wherein the cold vaporizing moisture source(s) 104 and the hot vaporizing moisture source(s) 105 are isolated/separated from one another, e.g. via a wall, thereby preventing hot water within said hot vaporizing moisture source(s) 105 from passing/penetrating into said cold vaporizing moisture source 104. In another specific embodiment, said separated vaporizing moisture sources 104, 105 within said single moisture generator are fluidly connected to one another, enabling maintaining the water level equal in each separated vaporizing moisture source.

In certain embodiments, said vaporizing moisture sources 104, 105 comprise: (i) a water tank 106, optionally divided into several independent tanks 104, 105 (e.g. two tanks—one for hot vapor and the other for cold vapor); (ii) moisture generator, such as heat-generator(s) for the hot vapors, or ultrasonic generators for cold vapors; (iii) a cover 107 comprising at least one opening 108 for air to enter and at least one opening 102 for the vapors to exit; (iv) at least one buoy, either electric or mechanic, for measuring the water level within said water tank 106, e.g. to verify that the water tank 106 is not empty or flooded; (v) optionally, an additional buoy for protection of the system 100 or device from over-heating due to complete depletion of water from said vaporizing moisture sources 104, 105, wherein said buoy shuts down the system 100 or device when there is insufficient amount of water in the water tank 106; (vi) at least one thermostat for measuring the temperature within said water tank 106, e.g. to verify that the water temperature does not exceed a predefined temperature, due to e.g. passage of water from the hot vaporizer into the cold vaporizer, or due to water depletion and overheating of the heat-generator within said hot vaporizer. In a specific embodiment, one thermostat may be associated with one of said at least one buoy; and (vii) at least one faucet, either electric of mechanic, for adding water into said water tank 106 when needed, i.e. when the water level is reduced to a certain level, and/or for draining said water tank 106 if and when needed.

In certain embodiments, said control unit is associated with said cabinet housing 101, e.g. assembled on its upper part or located remotely and is wired or wirelessly connected thereto. In a specific embodiment, said control unit comprises at least one of: power switch, light indicators, UV light switch, heat indicator, humidity indicator, air speed gauge, temperature display, water level within each water tank 106, an alarm unit, etc.

In specific embodiments, the system 100 or device according to the invention can be used to generate heat and humidity in a room according to specific desire and need. For instance, the system 100 or device of the invention is designed for use in dough thawing, rising and proofing by providing specific humidity and temperature environment ideal for the rising of the dough. In other embodiments, the system 100 or device is designed for use in hydrating dates by providing highly humid environment surrounding said dates while constantly circulating the air within the room.

In certain embodiments, the temperature and humidity generating system 100 of the invention is capable of hydrating dates quickly and bring them to a first graded level within 24 hours. In specific embodiments, the system 100 hydrates dates to a first graded level within 12, 8 or even 4 hours, by creating a uniform humid environment with a constant predefined temperature, while circulating the air within the hydrating room.

In other embodiments the present invention provides a method for generating constant temperature and humidity within a room, said method comprises the steps of: (a) providing the system 100 or the device of the invention and connecting thereof to a water supply; (b) placing said system 100 or device within said room or connecting said vapor openings 102 to said room, e.g. with pipes; (c) determining the desired temperature and humidity; and (d) activating said system 100 or device.

Figure 2:
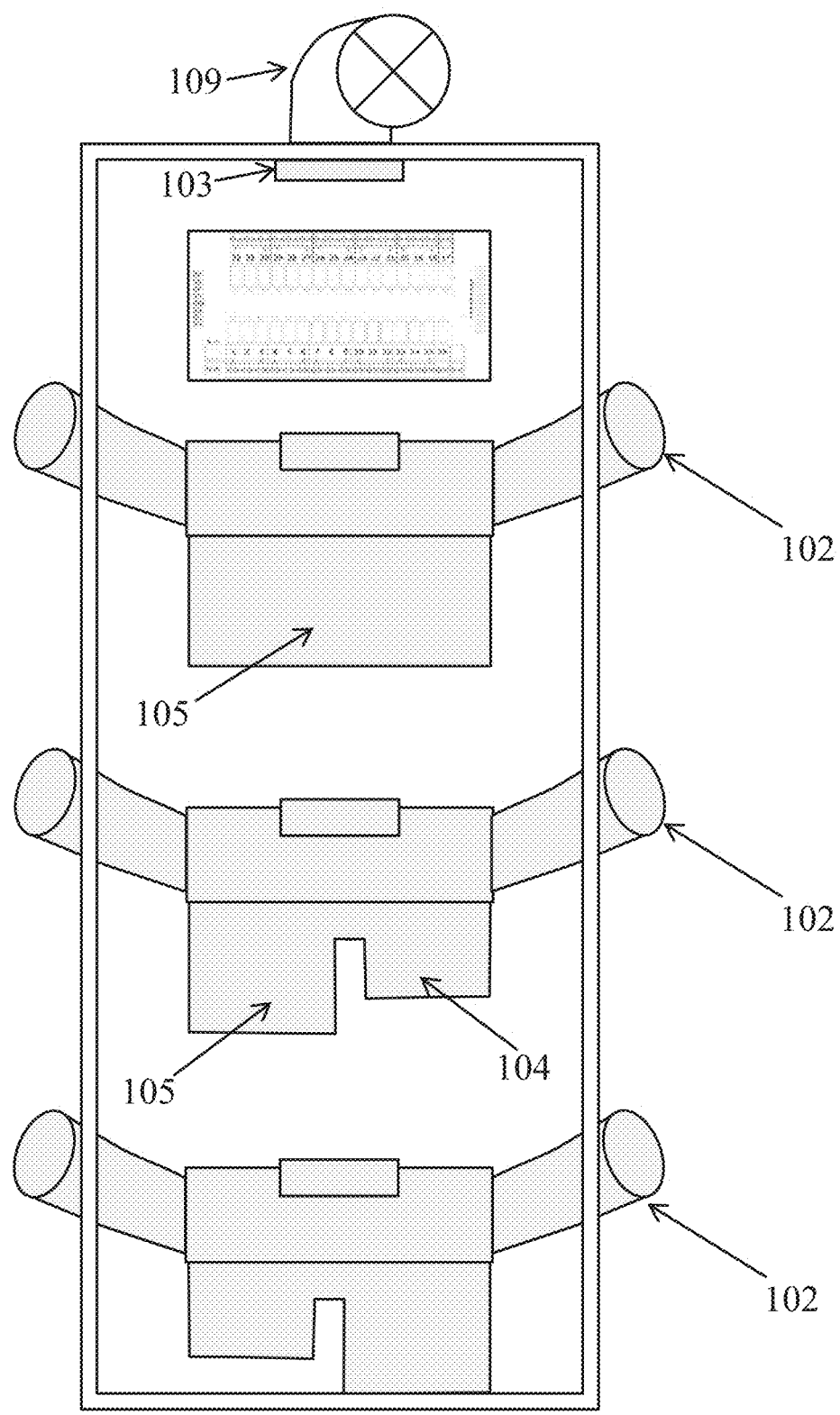
FIG. 2 illustrates the inner components of the cabinet housing of the system according to some embodiments of the invention.
Figure 3:
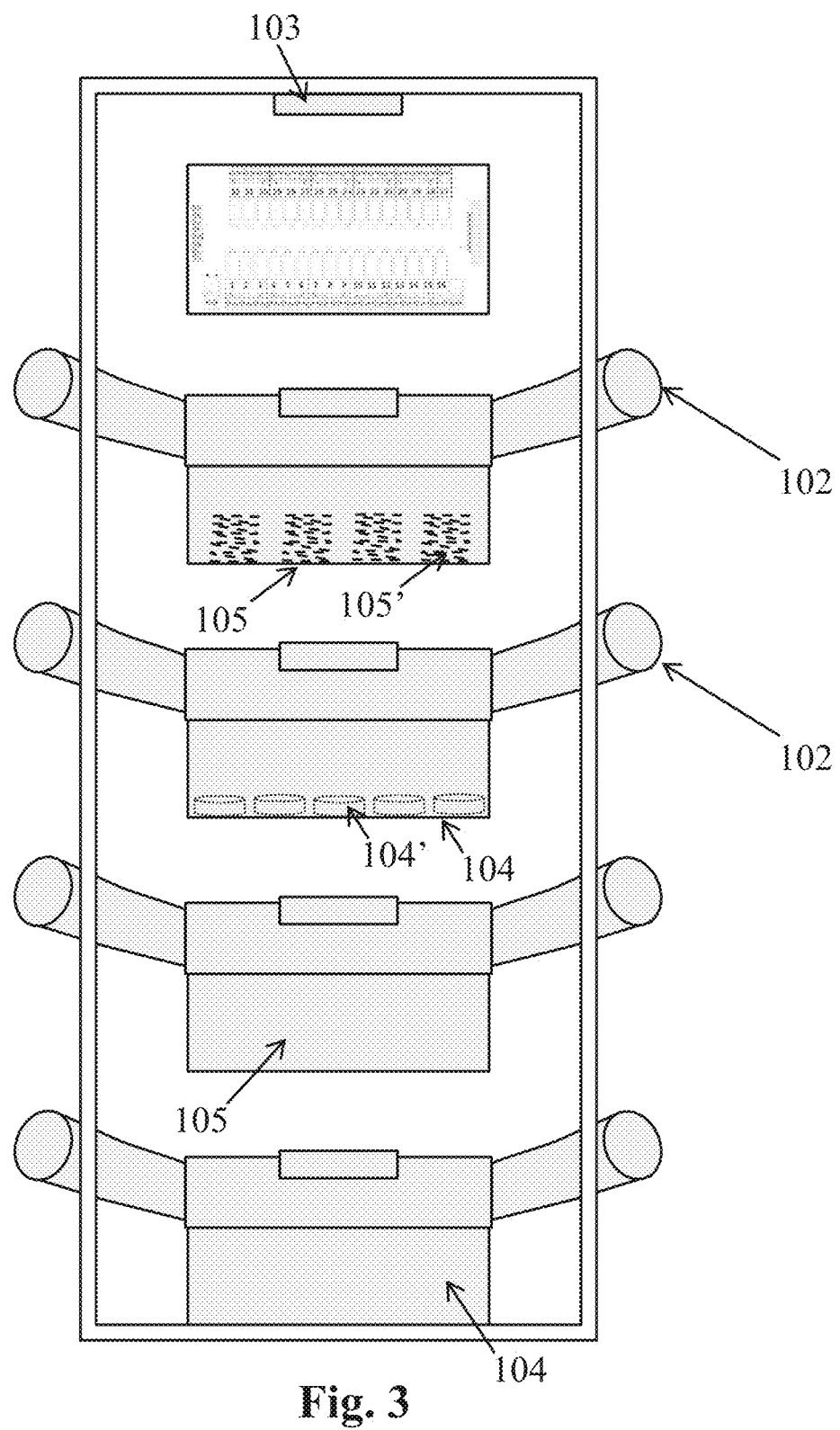
FIG. 3 illustrates another configuration of the inner components of the cabinet housing of the system according to some embodiments of the invention.

Reference is now made to FIG. 1 showing an assembled cabinet housing 101 of the system 100 or device of the invention. FIG. 2 illustrates the interior of the same cabinet housing 101 after the removal of the front cover: shown are three vaporizing moisture sources: one comprising only a single chamber for generating hot vapors 105 and two comprising two chambers—one for hot vapors 105 and the other for cold vapors 104. Each vaporizing moisture source is connected to two vapor exit pipes 102 for the vapors to exit into the room. FIG. 3 illustrates another possible configuration of the system 100 or device of the invention, comprising four undivided vaporizing moisture sources: two for hot vapors 105 and two for cold vapors 104. Each vaporizing moisture source is connected to two vapor exit pipes 102. FIG. 3 further illustrates the heaters 105' located within said hot vaporizing moisture source 105, and the ultrasonic generators 104' located within said cold vaporizing moisture source 104.

The size of the cabinet housing 101 and the size and number of the different vaporizing moisture sources 104, 105 may vary according to need. For instance, the cabinet housing 101 may be from 0.5 to 4 meter tall, and may comprise 1, 2, 3, 4, 5, 6, 7, 8, 9, 10 or more vaporizing moisture sources 104, 105. The thickness and width of the cabinet housing 101 may be the same of different and can be customized according to the user's needs.

It should be noted that the number of vaporizing moisture sources and their orientation and order within the cabinet housing 101 can be easily modified according to ones needs and desire. In addition, the system 100 or device according to the invention can be configured such that all or some of the vaporizing moisture sources therein are activated—depending on the desired humidity and temperature. In specific embodiments, some vaporizing moisture sources may be activated or deactivated during a single operation protocol depending on the desired humidity and temperature and the measured humidity and temperature within the room.

Figure 4:
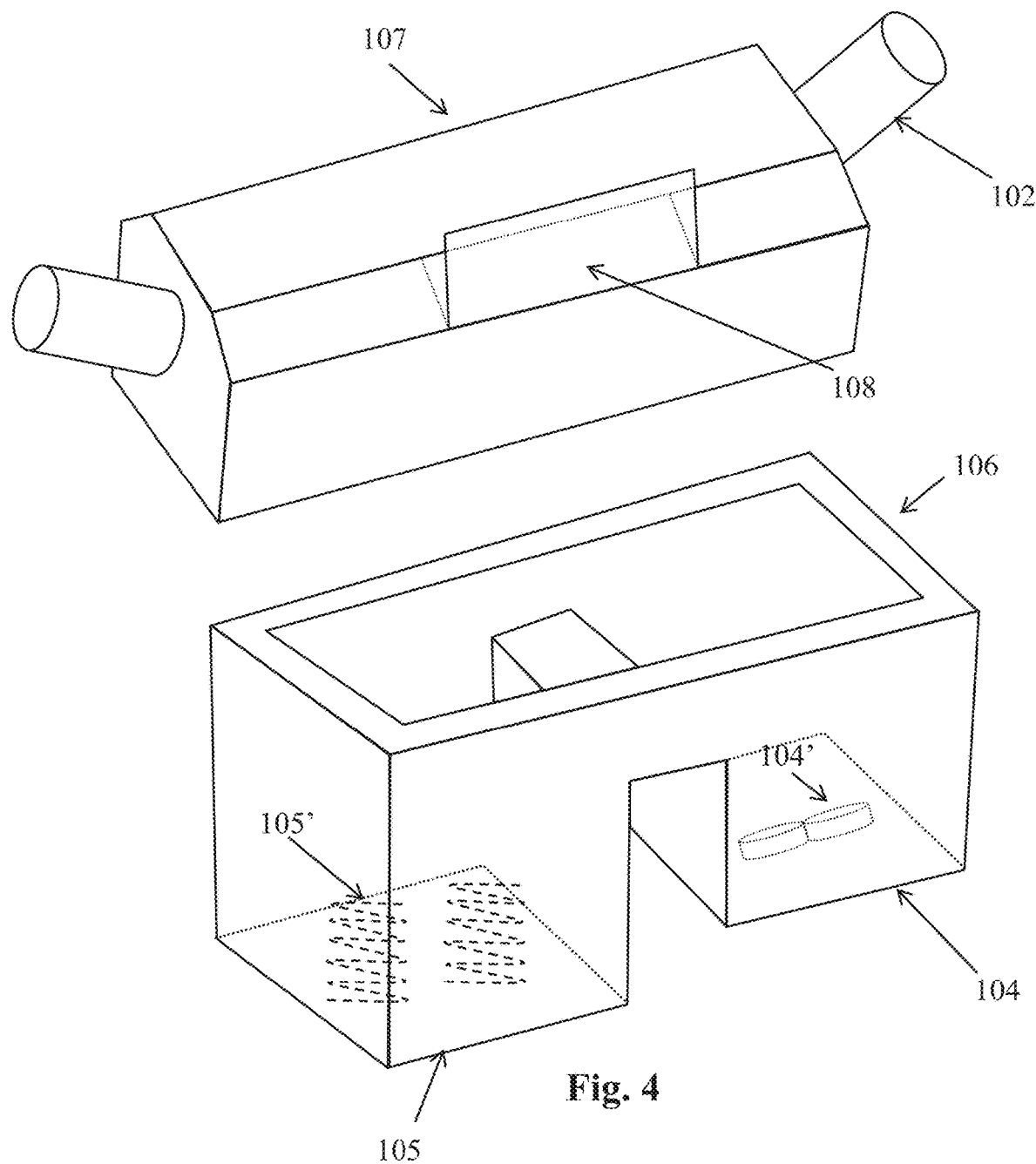
FIG. 4 illustrates a combined hot- and cold-vaporizing moisture source.

Reference is now made to FIG. 4 showing an exploded view of a two-chambered vaporizing moisture source: illustrated is the water tank 106 divided into two separate chamber—one for generating hot vapors comprising heat-generators 105' at the bottom of the hot vaporizing moisture source 105, and the other for cold vapors comprising ultrasonic-generators 104' at the bottom of the cold vaporizing moisture source 104. Also illustrated is the cover 107 comprising a single air opening 108 designed to provide air to both hot- and cold-vaporizing moisture sources, as well as two vapor exits pipes 102, each located such that only one type of vapors can exit therethrough.

Figure 5:
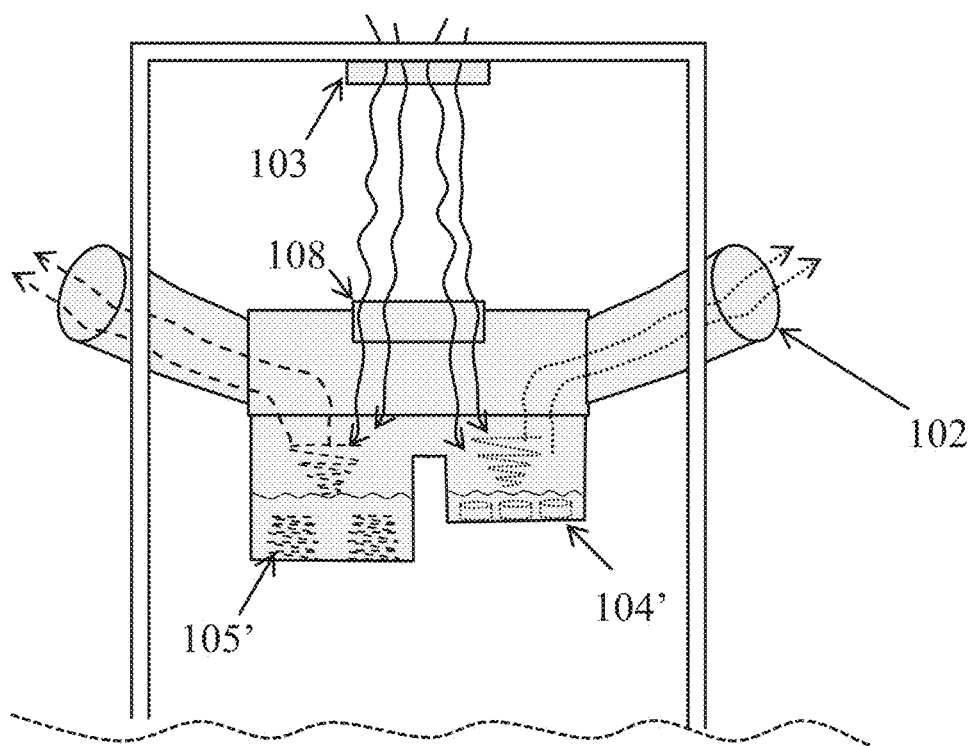
FIG. 5 illustrates the air and vapor flow within a combined hot- and cold-vaporizing moisture source.

Reference is now made to FIG. 5 illustrating the flow of air within the system 100 or the device of the invention: air is blown from said air blower 109 into the cabinet housing 101 via said air entry window 103; the air flows across said vaporizing moisture sources 104, 105 and enters therein via said designated opening 108 at said cover 107; then the air pushes the vapors generated within each moisture source through the designated exit openings 102 and into said room, thereby providing hot and/or cold vapors as needed.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed above even when not initially claimed or mentioned in such combinations. A teaching that two elements are combined is further to be understood as also allowing for a combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A temperature and humidity generating system comprising:
   a) a cabinet housing having an air entry window;
   b) at least one cold vaporizing moisture source having at least one vapor opening;
   c) at least one hot vaporizing moisture source having at least one vapor opening;
   d) an air blower associated with said air entry window;
   e) at least one sensor for measuring humidity and/or temperature within said cabinet housing, a room, and/or water within said at least one vaporizing moisture sources; and
   f) a control unit for controlling said vaporizing moisture sources and said air blower,
   wherein each of said vaporizing moisture sources comprises:
      a water tank, optionally divided into two independent tanks;
      a vaporizing moisture generator;
      a cover with at least one opening for air to enter and at least one vapor opening for the vapors to exit;
      at least one buoy to measure the water level within said water tank;
      an additional buoy for protecting the system from complete depletion of water from said vaporizing moisture sources;

at least one thermostat for measuring the temperature within said water tank; and at least one faucet, and wherein said system is designed to generate a desired climate within a room by blowing cold and hot vapors into the room according to need, thereby generating an environment within said room having a predefined humidity and temperature.

2. The system of claim 1 further comprising a computer comprising a processor and a memory, coupled to said control unit and said at least one sensor.

3. The system of claim 1, wherein said air blower is designed to blow air into said cabinet housing and across both said cold and hot vaporizing sources.

4. The system of claim 1 further comprising a sterilization unit.

5. The system of claim 1, wherein said at least one cold vaporizing moisture source uses ultrasonic generator or nozzles for generating cold vapors.

6. The system of claim 1, wherein said at least one hot vaporizing moisture source uses heat- or steam-generator for generating hot vapors.

7. The system of claim 1, further comprising at least one air heater.

8. The system of claim 1 further comprising an opening opposing said entry window.

9. The system of claim 8, wherein said opening is located at the lower section of said cabinet housing, and said system further comprises an air heater located at said opening for heating the air exiting said cabinet housing.

10. The system of claim 1, wherein said at least one cold vaporizing moisture source and said at least one hot vaporizing moisture source constitute separate compartments of a single moisture generator.

11. The system of claim 1, wherein said control unit is associated with said cabinet housing.

12. The system of claim 1 for use in dough thawing, rising and proofing.

13. The system of claim 1 for use in hydrating dates.

14. A temperature and humidity generating device comprising:
    a) a cabinet housing having an air entry window;
    b) at least one cold vaporizing moisture source having at least one vapor opening;
    c) at least one hot vaporizing moisture source having at least one vapor opening;
    d) an air blower associated with said air entry window;
    e) at least one sensor for measuring humidity and/or temperature within said cabinet housing, the room, and/or the water within said at least one vaporizing moisture sources; and
    f) a control unit for controlling said vaporizing moisture sources and said air blower,
    wherein said device is designed to generate a desired climate within a room by blowing cold and hot vapors into said room according to need, thereby generating an environment within said room having a predefined humidity and temperature.

15. A method for generating temperature and humidity within a room, said method comprises the steps of:
    a) providing the system of claim 1 or the device of claim 14 and connecting thereof to a water supply;
    b) placing said system or said device within said room or connecting said vapor openings to said room, e.g. with pipes;
    c) determining the desired temperature and humidity; and
    d) activating said system or said device.

* * * * *